US010657056B2

(12) United States Patent
Tamir et al.

(10) Patent No.: US 10,657,056 B2
(45) Date of Patent: May 19, 2020

(54) TECHNOLOGIES FOR DEMOTING CACHE LINES TO SHARED CACHE

(71) Applicant: Intel Corporation, Santa Clara, CA (US)

(72) Inventors: Eliezer Tamir, Bait Shemesh (IL); Bruce Richardson, Shannon (IE); Niall Power, Limerick (IE); Andrew Cunningham, Ennis (IE); David Hunt, Meelick (IE); Kevin Devey, Limerick (IE); Changzheng Wei, Shang Hai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/024,773

(22) Filed: Jun. 30, 2018

(65) Prior Publication Data

US 2019/0042419 A1 Feb. 7, 2019

(51) Int. Cl.
*G06F 12/084* (2016.01)
*G06F 12/1072* (2016.01)
(Continued)

(52) U.S. Cl.
CPC ........ *G06F 12/084* (2013.01); *G06F 12/1072* (2013.01); *G06F 12/128* (2013.01); *G06F 13/28* (2013.01); *H04L 49/10* (2013.01); *G06F 2212/1024* (2013.01); *G06F 2212/154* (2013.01); *G06F 2212/622* (2013.01)

(58) Field of Classification Search
CPC ......................... G06F 12/084; G06F 2212/154
See application file for complete search history.

(56) References Cited

U.S. PATENT DOCUMENTS 8,099,521 B2 * 1/2012 Reed ................... G06F 12/0802 709/250
8,937,942 B1 * 1/2015 Li ....................... H04L 67/1097 370/386

(Continued)

FOREIGN PATENT DOCUMENTS

CN 102063407 5/2011

OTHER PUBLICATIONS

Extended European search report for European patent application No. 19177464.5, dated Nov. 18, 2019 (11 pages).

*Primary Examiner* — Edward J Dudek, Jr.
(74) *Attorney, Agent, or Firm* — Barnes & Thornburg LLP

(57) ABSTRACT

Technologies for demoting cache lines to a shared cache include a compute device with at least one processor having multiple cores, a cache memory with a core-local cache and a shared cache, and a cache line demote device. A processor core of a processor of the compute device is configured to retrieve at least a portion of data of a received network packet and move the data into one or more core-local cache lines of the core-local cache. The processor core is further configured to perform a processing operation on the data and transmit a cache line demotion command to the cache line demote device subsequent to having completed the processing operation. The cache line demote device is configured to perform a cache line demotion operation to demote the data from the core-local cache lines to shared cache lines of the shared cache. Other embodiments are described herein.

21 Claims, 5 Drawing Sheets

(51) Int. Cl.

| | |
|---|---|
| ***H04L 12/933*** | (2013.01) |
| ***G06F 12/128*** | (2016.01) |
| ***G06F 13/28*** | (2006.01) |

(56) References Cited

U.S. PATENT DOCUMENTS

| | | | | |
|---|---|---|---|---|
| 2008/0235450 | A1* | 9/2008 | Han | H04L 45/60<br>711/118 |
| 2012/0124292 | A1* | 5/2012 | Shum | G06F 12/0817<br>711/125 |
| 2017/0351618 | A1* | 12/2017 | Ash | G06F 12/122 |
| 2018/0095880 | A1 | 4/2018 | Doshi et al. | |
| 2018/0143905 | A1* | 5/2018 | Roberts | G06F 12/0815 |

* cited by examiner

TECHNOLOGIES FOR DEMOTING CACHE LINES TO SHARED CACHE

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications between computing devices, the data networks typically include one or more network computing devices (e.g., compute servers, storage servers, etc.) to route communications (e.g., via switches, routers, etc.) that enter/exit a network (e.g., north-south network traffic) and between network computing devices in the network (e.g., east-west network traffic). In present packet-switched network architectures, data is transmitted in the form of network packets between networked computing devices. At a high level, data is packetized into a network packet at one computing device and the resulting packet transmitted, via a transmission device (e.g., a network interface controller (NIC) of the computing device), to another computing device over a network.

Upon receipt of a network packet, the computing device typically performs one or more processing operations (e.g., security, network address translation (NAT), load-balancing, deep packet inspection (DPI), transmission control protocol (TCP) optimization, caching, Internet Protocol (IP) management, etc.) to determine what the computing device is to do with the network packet (e.g., drop the network packet, process/store at least a portion of the network packet, forward the network packet, etc.). To do so, such packet processing is often performed in a packet processing pipeline (e.g., a service function chain) where at least a portion of the data of the network packet is passed from one processor core to another as it is processed. However, during such packet processing, stalls can occur due to cross-core snoops and cache pollution with stale data can be a problem.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
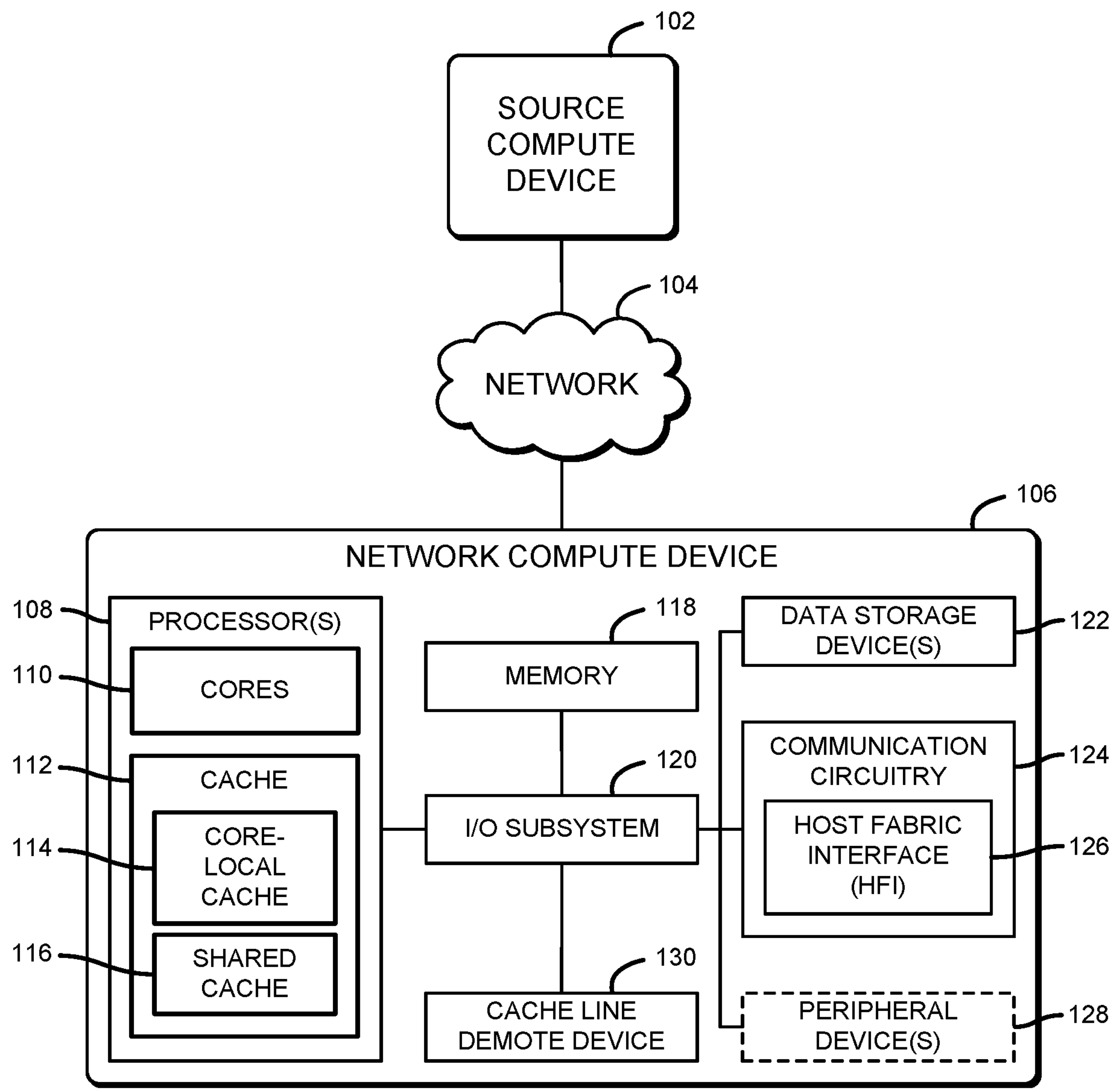
FIG. 1 is a simplified block diagram of at least one embodiment of a system for demoting cache lines to shared cache that includes a source compute device and a network compute device communicatively coupled via a network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for demoting cache lines to shared cache includes a source compute device 102 communicatively coupled to a network compute device 106 via a network 104. While illustratively shown as having a single source compute device 102 and a single network compute device 106, the system 100 may include multiple source compute devices 102 and multiple network compute devices 106, in other embodiments. It should be appreciated that the source compute device 102 and network compute device 106 have been illustratively designated herein as being one of a "source" and a "destination" for the purposes of providing clarity to the description and that the source compute device 102 and/or the network compute device 106 may be capable of performing any of the functions described herein. It should be further appreciated that the source compute device 102 and the network compute device 106 may reside in the same data center or high-performance computing (HPC) environment. In other words, the source compute device 102 and network compute device 106 may reside in the same network 104 connected via one or more interconnects.

In use, the source compute device 102 and the network compute device 106 transmit and receive network traffic (e.g., network packets, frames, etc.) to/from each other. For example, the network compute device 106 may receive a network packet from the source compute device 102. Upon receipt of a network packet, the network compute device 106, or more particularly a host fabric interface (HFI) 126 of the network compute device 106, identifies one or more processing operations to be performed on at least a portion of the network packet and performs some level of processing thereon. To do so, a processor core 112 requests access to data which may have been previously stored or moved into shared cache memory, typically on-processor or near-processor cache. The network compute device 106 is configured to move the requested data to a core-local cache (e.g., the core-local cache 114) for quicker access to the requested data by the requesting processor core 112.

Oftentimes, more than one processing operation (e.g., security, network address translation (NAT), load-balancing, deep packet inspection (DPI), transmission control protocol (TCP) optimization, caching, Internet Protocol (IP) management, etc.) is performed by the network compute device, with each operation typically performed by a different processor core in a packet processing pipeline, such as a service function chain. Accordingly, the data accessed by one processor core needs to be released (e.g., demoted to the shared cache 116) upon processing completion in order for the next processor core to perform its designated processing operation.

To do so, as will be described in further detail below, the network compute device 106 is configured to either transmit instructions to a cache manager to demote cache line(s) from the core-local cache 114 to the shared cache 116 or transmit a command to an offload device (see, e.g., the cache line offload device 130) to trigger a cache line demotion operation to be performed by the offload device to demote cache line(s) from the core-local cache 114 to the shared cache 116, based on a size of the network packet. In other words, each processor core demotes the applicable packet cache lines to the shared cache 116 once processing has been completed, which allows better cache reuse on a first processing core and saves cross-core snoops on a second processing core in the packet processing pipeline (e.g., modifying data) or input/output (I/O) pipeline. Accordingly, unlike present technologies, stalls due to cross-core snoops and cache pollution can be effectively avoided. Additionally, also unlike present technologies, the cost attributable to an ownership request when the requested data is not in the shared cache or otherwise inaccessible by the requesting processor core can be avoided.

The network compute device 106 may be embodied as any type of computation or computer device capable of performing the functions described herein, including, without limitation, a computer, a server (e.g., stand-alone, rack-mounted, blade, etc.), a sled (e.g., a compute sled, an accelerator sled, a storage sled, a memory sled, etc.), an enhanced or smart network interface controller (NIC)/HFI, a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system.

As shown in FIG. 1, the illustrative network compute device 106 includes one or more processors 108, memory 118, an I/O subsystem 120, one or more data storage devices 122, communication circuitry 124, a demote device 130, and, in some embodiments, one or more peripheral devices 128. It should be appreciated that the network compute device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The processor(s) 108 may be embodied as any type of device or collection of devices capable of performing the various compute functions as described herein. In some embodiments, the processor(s) 108 may be embodied as one or more multi-core processors, digital signal processors (DSPs), microcontrollers, or other processor(s) or processing/controlling circuit(s). In some embodiments, the processor(s) 108 may be embodied as, include, or otherwise be coupled to an integrated circuit, an embedded system, a field-programmable-array (FPGA) (e.g., reconfigurable circuitry), a system-on-a-chip (SOC), an application specific integrated circuit (ASIC), reconfigurable hardware or hardware circuitry, or other specialized hardware to facilitate performance of the functions described herein.

The illustrative processor(s) 108 includes multiple processor cores 110 (e.g., two processor cores, four processor cores, eight processor cores, sixteen processor cores, etc.) and a cache memory 112. Each of processor cores 110 may be embodied as an independent logical execution unit capable of executing programmed instructions. It should be appreciated that, in some embodiments, the network compute device 106 (e.g., in supercomputer embodiments) may include thousands of processor cores. Each of the processor (s) 108 may be connected to a physical connector, or socket, on a motherboard (not shown) of the network compute device 106 that is configured to accept a single physical processor package (i.e., a multi-core physical integrated circuit). Further, each of the processor cores 110 is communicatively coupled to at least a portion of the cache memory 112 and functional units usable to independently execute programs, operations, threads, etc. It should be appreciated that the processor(s) 108 as described herein are not limited to being on the same die, or socket.

The cache memory 112, which may be embodied as any type of cache that the processor 104 can access more quickly than the memory 118 (i.e., main memory), such as an on-die cache, or on-processor cache. In other embodiments, the cache memory 108 may be an off-die cache, but reside on the same system-on-a-chip (SoC) as the processor 104. The illustrative cache memory 112 includes a multi-level cache architecture embodied as a core-local cache 114 and a shared cache 116. The core-local cache 114 may be embodied as a cache memory dedicated to a particular one of the processor cores 110. Accordingly, while illustratively shown as a single core-local cache 114, it should be appreciated that there may be at least one core-local cache 114 for each processor core 110, in some embodiments.

The shared cache 116 may be embodied as a cache memory, typically larger than the core-local cache 114 and shared by all of the processor cores 110 of a processor 108. For example, in an illustrative embodiment, the core-local cache 114 may be embodied as a level 1 (L1) cache and a level 2 (L2) cache, while the shared cache 116 may be embodied as a layer 3 (L3) cache. In such embodiments, it should be appreciated that the L1 cache may be embodied as any memory type local to a processor core 110, commonly referred to as a "primary cache" that is the fastest memory closest to the processor 108. It should be further appreciated that, in such embodiments, the L2 cache may be embodied as any type of memory local to a processor core 110, commonly referred to as a "mid-level cache" that is capable of feeding the L1 cache, having larger, slower memory than the L1 cache, but typically smaller, faster memory than the L3/shared cache 116 (i.e., last-level cache (LLC)). In other embodiments, the multi-level cache architecture may include additional and/or alternative levels of cache memory. While not illustratively shown in FIG. 1, it should be further appreciated that the cache memory 112 includes a memory controller (see, e.g., the cache manager 214 of FIG. 2), which may be embodied as a controller circuit or other logic that serves as an interface between the processor 108 and the memory 118.

The memory 118 may be embodied as any type of volatile or non-volatile memory or data storage capable of performing the functions described herein. In operation, the memory 118 may store various data and software used during operation of the network compute device 106, such as operating systems, applications, programs, libraries, and drivers. It should be appreciated that the memory 118 may be referred to as main memory (i.e., a primary memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

Each of the processor(s) 108 and the memory 118 are communicatively coupled to other components of the network compute device 106 via the I/O subsystem 114, which may be embodied as circuitry and/or components to facilitate input/output operations with the processor(s) 108, the memory 118, and other components of the network compute device 106. For example, the I/O subsystem 114 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 114 may form a portion of a SoC and be incorporated, along with one or more of the processors 108, the memory 118, and other components of the network compute device 106, on a single integrated circuit chip.

The one or more data storage devices 122 may be embodied as any type of storage device(s) configured for short-term or long-term storage of data, such as, for example, memory devices and circuits, memory cards, hard disk drives, solid-state drives, or other data storage devices. Each data storage device 122 may include a system partition that stores data and firmware code for the data storage device 122. Each data storage device 122 may also include an operating system partition that stores data files and executables for an operating system.

The communication circuitry 124 may be embodied as any communication circuit, device, or collection thereof, capable of enabling communications between the network compute device 106 and other computing devices, such as the source compute device 102, as well as any network communication enabling devices, such as an access point, switch, router, etc., to allow communication over the network 104. Accordingly, the communication circuitry 124 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 124 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the network compute device 106, etc.), performing computational functions, etc.

In some embodiments, performance of one or more of the functions of communication circuitry 124 as described herein may be performed by specialized circuitry, hardware, or combination thereof of the communication circuitry 124, which may be embodied as a SoC or otherwise form a portion of a SoC of the network compute device 106 (e.g., incorporated on a single integrated circuit chip along with a processor 108, the memory 118, and/or other components of the network compute device 106). Alternatively, in some embodiments, the specialized circuitry, hardware, or combination thereof may be embodied as one or more discrete processing units of the network compute device 106, each of which may be capable of performing one or more of the functions described herein.

The illustrative communication circuitry 124 includes the HFI 126, which may be embodied as one or more add-in-boards, daughtercards, network interface cards, controller chips, chipsets, or other devices that may be used by the network compute device 106 to connect with another compute device (e.g., the source compute device 102). In some embodiments, the HFI 126 may be embodied as part of a SoC that includes one or more processors, or included on a multichip package that also contains one or more processors. In some embodiments, the HFI 126 may include a local processor (not shown) and/or a local memory (not shown) that are both local to the HFI 126. In such embodiments, the local processor of the HFI 126 may be capable of performing one or more of the functions of a processor 108 described herein. Additionally or alternatively, in such embodiments, the local memory of the HFI 126 may be integrated into one or more components of the network compute device 106 at the board level, socket level, chip level, and/or other levels.

The one or more peripheral devices 128 may include any type of device that is usable to input information into the network compute device 106 and/or receive information from the network compute device 106. The peripheral devices 128 may be embodied as any auxiliary device usable to input information into the network compute device 106, such as a keyboard, a mouse, a microphone, a barcode reader, an image scanner, etc., or output information from the network compute device 106, such as a display, a speaker, graphics circuitry, a printer, a projector, etc. It should be appreciated that, in some embodiments, one or more of the peripheral devices 128 may function as both an input device and an output device (e.g., a touchscreen display, a digitizer on top of a display screen, etc.). It should be further appreciated that the types of peripheral devices 128 connected to the network compute device 106 may depend on, for example, the type and/or intended use of the network compute device 106. Additionally or alternatively, in some embodiments, the peripheral devices 128 may include one or more ports, such as a USB port, for example, for connecting external peripheral devices to the network compute device 106.

The cache line demote device 130 may be embodied as any type of firmware, software, and/or hardware device that is usable to initiate a cache line demotion from core-local cache 114 to shared cache 116. In some embodiments, the cache line demote device 130 may be embodied as, but is not limited to a copy engine, a direct memory access (DMA) device usable to copy data, an offload read-capable device, etc. It should be appreciated that the cache line demote device 130 may be any type of device that is capable of reading or pretending to read data, so long as when the device interacts with the data or otherwise requests access to the data, the cache lines associated with that data will get demoted to shared cache 116 as a side effect.

The source compute device 102 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a sled (e.g., a compute sled, an accelerator sled, a storage sled, a memory sled, etc.), a network appliance (e.g., physical or virtual), a web appliance, a distributed computing system, a processor-based system, and/or a multiprocessor system. While not illustratively shown, it should be appreciated that source compute device 102 includes similar and/or like components to those of the illustrative network compute device 106. As such, figures and descriptions of the like components are not repeated herein for clarity of the description with the understanding that the description of the corresponding components provided above in regard to the network compute device 106 applies equally to the corresponding components of the source compute device 102. Of course, it should be appreciated that the computing devices may include additional and/or alternative components, depending on the embodiment.

The network 104 may be embodied as any type of wired or wireless communication network, including but not limited to a wireless local area network (WLAN), a wireless personal area network (WPAN), an edge network (e.g., a multi-access edge computing (MEC) network), a fog network, a cellular network (e.g., Global System for Mobile Communications (GSM), Long-Term Evolution (LTE), 5G, etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the network compute device 106 and the source compute device 102, which are not shown to preserve clarity of the description.

Figure 2:
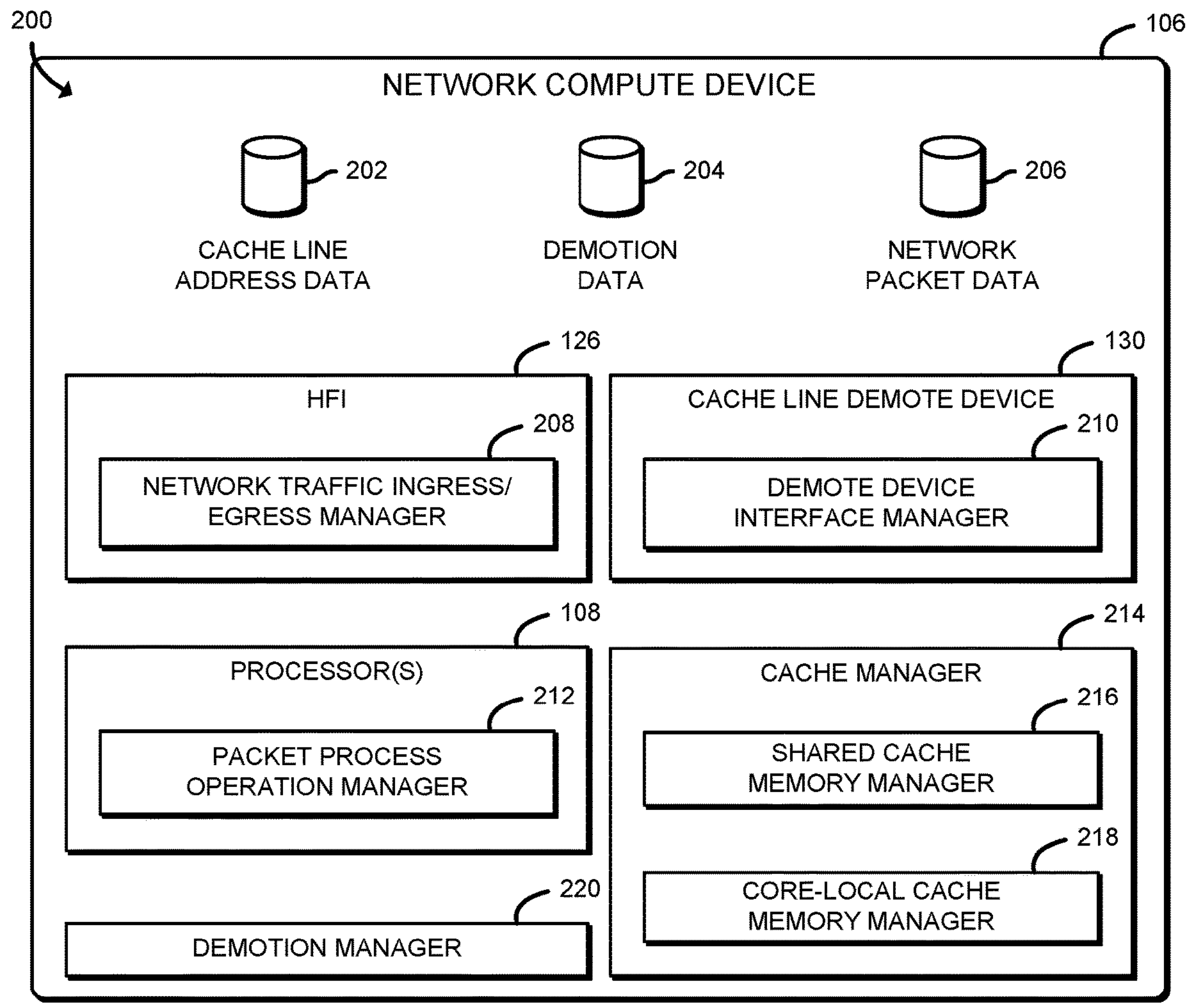
FIG. 2 is a simplified block diagram of at least one embodiment of an environment of the network compute device of the system of FIG. 1.

Referring now to FIG. 2, in use, the network compute device 106 establishes an environment 200 during operation. The illustrative environment 200 includes the processor(s) 108, the HFI 126, and the cache line demote device 130 of FIG. 1, as well as a cache manager 214 and a demotion manager 220. The illustrative HFI 126 includes a network traffic ingress/egress manager 208, the illustrative cache line demote device 130 includes an interface manager 210, and the illustrative processor(s) 108 include a packet process operation manager 212. The various components of the environment 200 may be embodied as hardware, firmware, software, or a combination thereof. As such, in some embodiments, one or more of the components of the environment 200 may be embodied as circuitry or collection of electrical devices (e.g., network traffic ingress/egress management circuitry 208, demote device interface management circuitry 210, packet process operation management circuitry 212, cache management circuitry 214, demotion management circuitry 220, etc.).

As illustratively shown, the network traffic ingress/egress management circuitry 208, the demote device interface management circuitry 210, the packet process operation management circuitry 212, the cache management circuitry 214, and the demotion management circuitry 220 form a portion of a particular component of the network compute device 106. However, while illustratively shown as being performed by a particular component of the network compute device 106, it should be appreciated that, in other embodiments, one or more functions described herein as being performed by the network traffic ingress/egress management circuitry 208, the demote device interface management circuitry 210, the packet process operation management circuitry 212, the cache management circuitry 214, and/or the demotion management circuitry 220 may be performed, at least in part, by one or more other components of the network compute device 106.

Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the HFI 126, the processor(s) 108, or other components of the network compute device 106. It should be appreciated that the network compute device 106 may include other components, sub-components, modules, sub-modules, logic, sub-logic, and/or devices commonly found in a computing device, which are not illustrated in FIG. 2 for clarity of the description.

In the illustrative environment 200, the network compute device 106 additionally includes cache line address data 202, demotion data 204, and network packet data 206, each of which may be accessed by the various components and/or sub-components of the network compute device 106. Further, each of the cache line address data 202, the demotion data 204, and the network packet data 206 may be accessed by the various components of the network compute device 106. Additionally, it should be appreciated that in some embodiments the data stored in, or otherwise represented by, each of the cache line address data 202, the demotion data 204, and the network packet data 206 may not be mutually exclusive relative to each other. For example, in some implementations, data stored in the cache line address data 202 may also be stored as a portion of one or more of the demotion data 204 and/or the network packet data 206, or in another alternative arrangement. As such, although the various data utilized by the network compute device 106 is described herein as particular discrete data, such data may be combined, aggregated, and/or otherwise form portions of a single or multiple data sets, including duplicative copies, in other embodiments.

The network traffic ingress/egress manager 208, which may be embodied as hardware, firmware, software, virtualized hardware, emulated architecture, and/or a combination thereof as discussed above, is configured to receive inbound and route/transmit outbound network traffic. To do so, the illustrative network traffic ingress/egress manager 208 is configured to facilitate inbound network communications (e.g., network traffic, network packets, network flows, etc.) to the network compute device 106 (e.g., from the source computing device 102). Accordingly, the network traffic ingress/egress manager 208 is configured to manage (e.g., create, modify, delete, etc.) connections to physical and virtual network ports (i.e., virtual network interfaces) of the network compute device 106 (e.g., via the communication circuitry 124), as well as the ingress buffers/queues associated therewith.

Additionally, the network traffic ingress/egress manager 208 is configured to facilitate outbound network communications (e.g., network traffic, network packet streams, network flows, etc.) from the network compute device 106. To do so, the network traffic ingress/egress manager 208 is configured to manage (e.g., create, modify, delete, etc.) connections to physical and virtual network ports/interfaces of the network compute device 106 (e.g., via the communication circuitry 124), as well as the egress buffers/queues associated therewith. In some embodiments, at least a portion of the network packet (e.g., at least a portion of a header of the network packet, at least a portion of a payload of the network packet, a checksum, etc.) may be stored in the network packet data 206.

The demote device interface manager 210, which may be embodied as hardware, firmware, software, virtualized hardware, emulated architecture, and/or a combination thereof as discussed above, is configured to manage the interface of the cache line demote device 130. For example, the demote device interface manager 210 is configured to receive cache line demote commands from the processor(s) 108 that are usable to identify which cache line(s) are to be demoted from core-local cache 114 to shared cache 116. Additionally, the demote device interface manager 210 is configured to perform some operation (e.g., a read request) in response to having received a cache line demote command to demote one or more cache lines from core-local cache 114 to shared cache 116. It should be appreciated that the cache line demote command includes an identifier of each cache line that is to be demoted from core-local cache 114 to shared cache 116 and each identifier is usable by the cache line demote device 130 to demote (e.g., copy, evict, etc.) the applicable cache line(s).

The packet process operation manager 212, which may be embodied as hardware, firmware, software, virtualized hardware, emulated architecture, and/or a combination thereof as discussed above, is configured to identify which packet processing operations are to be performed on at least a portion of the data of a received network packet (e.g., a header field of the network packet, a portion of the payload of the network packet, etc.) and the associated processor core 110 that each packet processing operation is to be performed thereby. Additionally, in some embodiments, the packet process operation manager 212 may be configured to identify when each packet processing operation has completed and provide an indication of completion (e.g., to the demotion manager 220). It should be appreciated that, while described herein as being performed by an associated processor core 110, one or more of the packet processing operations may be performed by any type of compute device/logic (e.g., an accelerator device/logic) that may need to access the cache memory 112.

The cache manager 214, which may be embodied as hardware, firmware, software, virtualized hardware, emulated architecture, and/or a combination thereof as discussed above, is configured to manage the cache memory 112 (e.g., the core-local cache 114 and the shared cache 116). To do so, the cache manager 214 is configured to manage the addition and eviction of entries into and out of the cache memory 112. Accordingly the cache manager 214, which may be embodied as or otherwise include a memory management unit is further configured to record results of virtual address to physical address translations. In such embodiments, the translations may be stored in the cache line address data 202. The cache manager 214 is additionally configured to facilitate the fetching of data from main memory and the storage of cached data to main memory, as well as the demotion of data from the applicable core-local cache 114 to the shared cache 116 and the promotion of data from the shared cache 116 to the applicable core-local cache 114.

The demotion manager 220, which may be embodied as hardware, firmware, software, virtualized hardware, emulated architecture, and/or a combination thereof as discussed above, is configured to manage the demotion of data from the core-local cache 114 to the shared cache 116. To do so, the demotion manager 220 is configured to either transmit instructions to a cache memory manger (e.g., the cache manager 214) to demote (e.g., copy, evict, etc.) the processed data from the core-local cache 114 to the shared cache 116, or transmit a command to the cache line demote device 130 to demote the processed data the core-local cache 114 to the shared cache 116. To determine whether to send the cache line demotion instruction to the cache manager 214 or the cache line demotion command to the cache line demote device 130, the demotion manager 220 is further configured to compare a size of a network packet to a predetermined packet size threshold.

If the demotion manager 220 determines the network packet size is greater than the packet size threshold, the demotion manager 220 is configured to transmit the cache line demotion instruction to the cache manager 214. Otherwise, if the demotion manager 220 determines the network packet size is less than or equal to the packet size threshold, the demotion manager 220 is configured to transmit the cache line demotion command to the cache line demote device 130. Additionally, the demotion manager 220 is configured to include an identifier of each cache line, or a range of cache lines, to be demoted from the core-local cache 114 to the shared cache 116 in the cache line demotion instructions/commands. As illustratively shown, the demotion manager 220 may be configured as an offload device; however, in some embodiments, the functions as described herein may be performed by or the demotion manager 220 may otherwise form a portion of the processor 108, or the processor cores 110. It should be appreciated that under such conditions in which the next cache location is known ahead of time, the demotion manager 220 may be configured to move the data to known core-local cache entries of the core-local cache associated with the next processor core in the packet processing pipeline.

Figure 3:
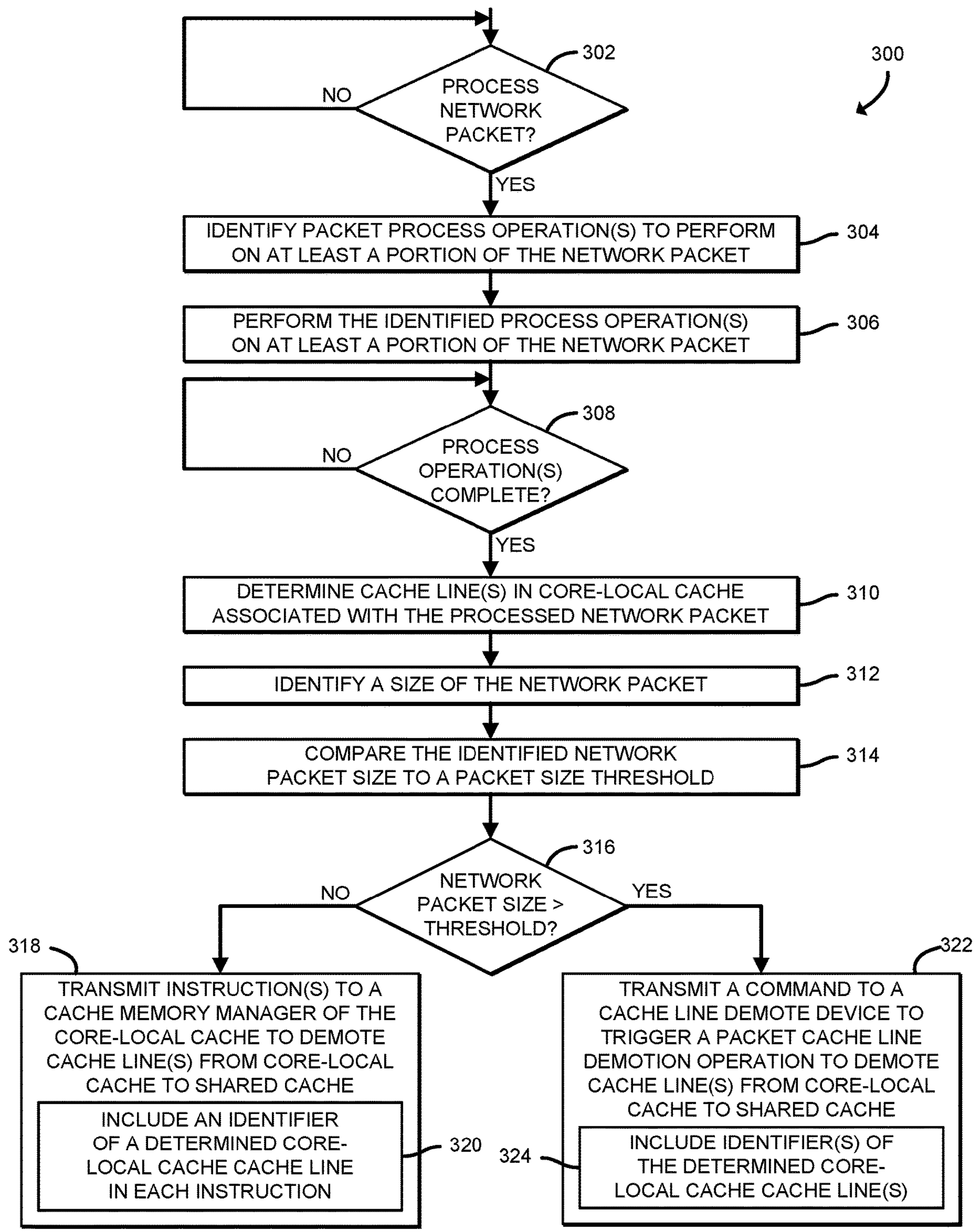
FIG. 3 is a simplified flow diagram of at least one embodiment of a method for demoting cache lines to shared cache that may be executed by the network compute device of FIGS. 1 and 2.

Referring now to FIG. 3, a method 300 for demoting cache lines to shared cache is shown which may be executed by a compute device (e.g., the network compute device 106 of FIGS. 1 and 2). The method 300 begins with block 302, in which the network compute device 106 determines whether to process a network packet (e.g., a processor 108 has polled the HFI 126 for the next packet to process). If so, the method 300 advances to block 304, in which the network compute device 106 identifies one or more packet processing operations to be performed on at least a portion of a network packet by a processor core 110. In block 306, the network compute device 106, or more particularly the requesting processor core 110, performs the identified packet processing operation(s) on the applicable portion of the network packet to be processed. It should be appreciated that, while described herein as being performed by a requesting processor core 110, one or more of the packet processing operations may be performed by any type of compute device/logic (e.g., an accelerator device/logic) that may need to access the cache memory 112.

In block 308, the network compute device 106 determines whether the requesting processor core 110, or applicable compute device/logic, has completed the identified packet processing operation(s), such as may be indicated by the requesting processor core 110. If so, the method 300 advances to block 310, in which the network compute device 106 determines which one or more cache lines in core-local cache 114 are associated with the processed network packet. Additionally, in block 312, the network compute device 106 identifies a size of the network packet. In block 314, the network compute device 106 compares the identified network packet size to a packet size threshold. In block 316, the network compute device 106 determines whether the identified network packet size is greater than the packet size threshold.

If the network compute device 106 determines that the identified network packet size is less than or equal to the packet size threshold the method 300 branches to block 318, in which the network compute device 106 is configured to transmit a cache line demotion instruction to the cache manager 214 to demote the one or more cache lines associated with the processed network packet from the core-local cache 114 to the shared cache 116. Additionally, in block 320, the network compute device includes a cache line identifier of each determined cache line in the core-local cache 114 in the cache line demotion instruction. Referring back to block 316, if the demotion manager 220 determines that the network packet size is greater than the packet size threshold, the method 300 branches to block 322, in which the network compute device 106 transmits a cache line demotion command to the cache line demote device 130 to trigger a cache line demotion operation to demote one or more cache lines associated with the processed network packet from the core-local cache 114 to the shared cache 116. Additionally, in block 324, the network compute device 106 includes one or more cache line identifiers corresponding to the one or more cache lines to be demoted in the cache line demotion command.

Figure 4:
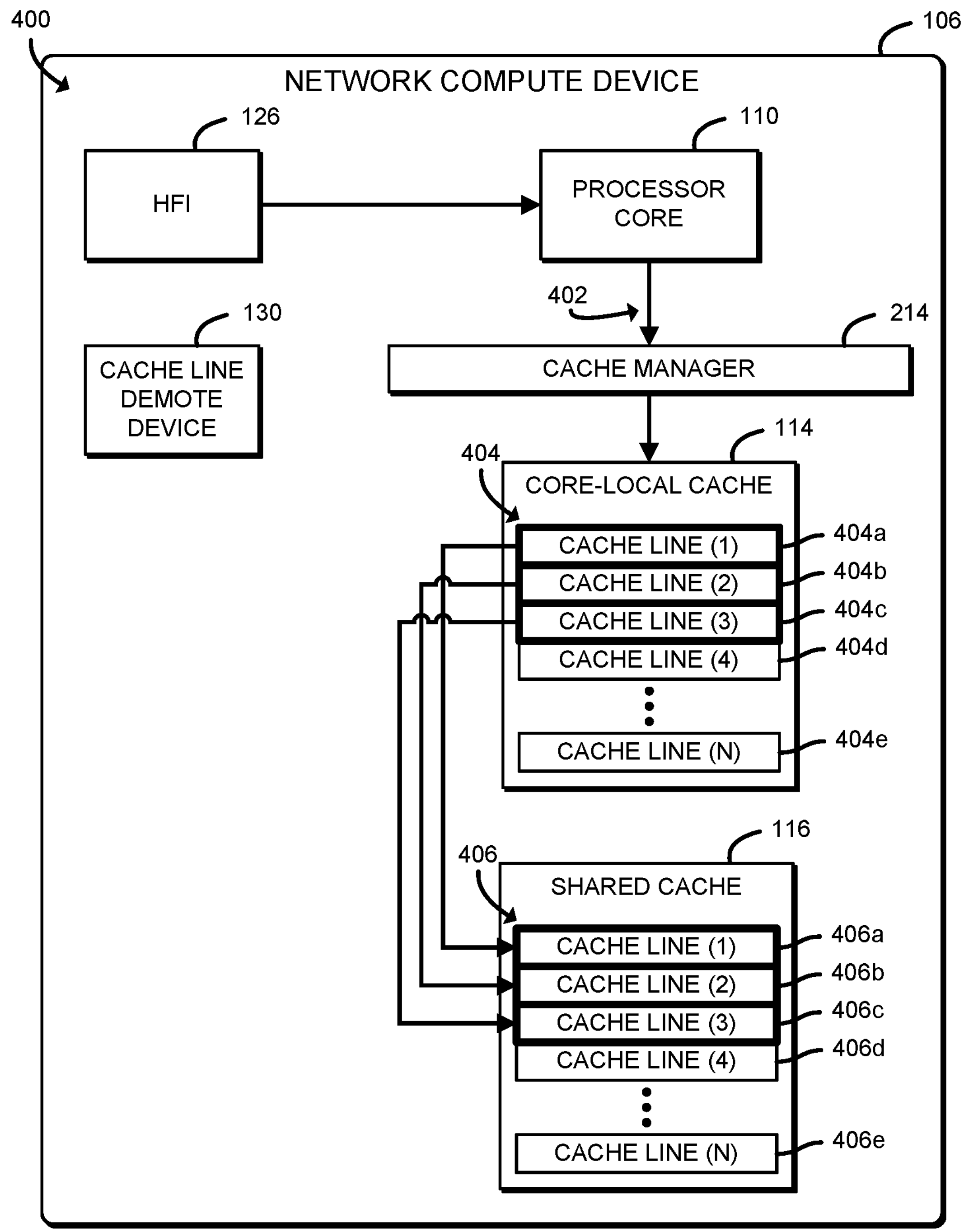
FIGS. 4 and 5 are simplified block diagram of at least one embodiment of another environment of the network compute device of FIGS. 1 and 2 for demoting cache lines to shared cache.
Figure 5:
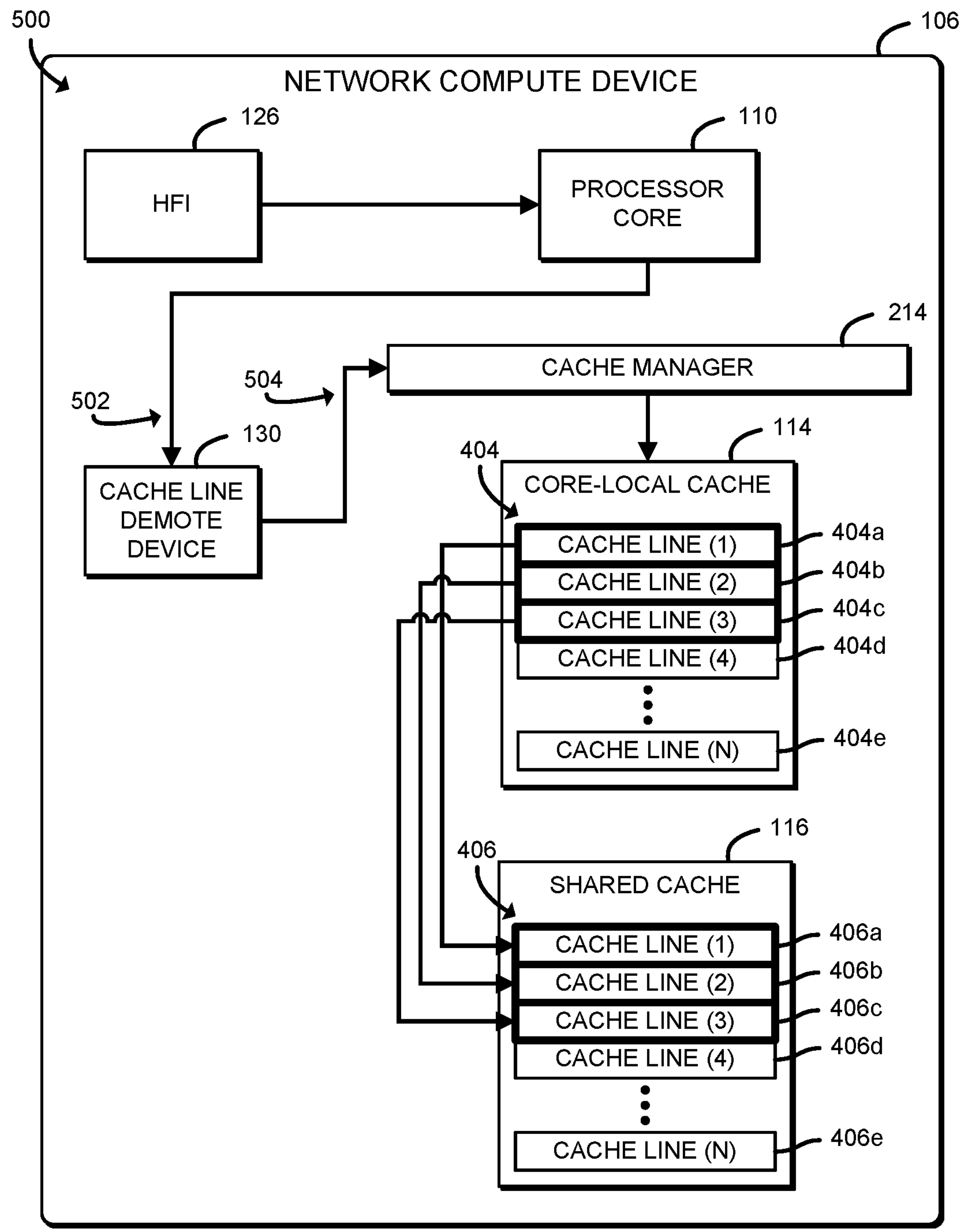

Referring now to FIGS. 4 and 5, in use, the network compute device 106 establishes an illustrative environment 400 for demoting cache lines to shared cache 116 via cache line demote instructions and an illustrative environment 500 for demoting cache lines to shared cache 116 via cache line demote commands to a cache line demote device 130. Referring now to FIG. 4, the illustrative environment 400 includes the HFI 126, a processor core 110, the core-local cache 114, the shared cache 116, and the demote device 130 of FIG. 1, as well as the cache manager 214 of FIG. 2. Each of the illustrative core-local cache 114 and the shared cache 116 include multiple cache entries.

As illustratively shown, the core-local cache 114 includes multiple core-local cache entries 404. The illustrative core-local cache entries 404 include a first core-local cache entry designated as core-local cache entry (1) 404*a*, a second core-local cache entry designated as core-local cache entry (2) 404*b*, a third core-local cache entry designated as core-local cache entry (3) 404*c*, a fourth core-local cache entry designated as core-local cache entry (4) 404*d*, and a fifth core-local cache entry designated as core-local cache entry (N) 404*e* (i.e., the "Nth" core-local cache entry 404, wherein "N" is a positive integer and designates one or more additional core-local cache entries 404). Similarly, the illustrative shared cache 116 includes multiple shared cache entries 406. The illustrative shared cache entries 406 include a first shared cache entry designated as shared cache entry (1) 406*a*, a second shared cache entry designated as shared cache entry (2) 406*b*, a third shared cache entry designated as shared cache entry (3) 406*c*, a fourth shared cache entry designated as shared cache entry (4) 406*d*, and a fifth shared cache entry designated as shared cache entry (N) 406*e* (i.e., the "Nth" shared cache entry 406, wherein "N" is a positive integer and designates one or more additional shared cache entries 406).

Referring now to FIG. 5, similar to the illustrative environment of FIG. 4, the illustrative environment 500 includes the HFI 126, the processor core 110, the core-local cache 114, the shared cache 116, and the demote device 130 of FIG. 1, as well as the cache manager 214 of FIG. 2. As described previously, the processor core 110 is configured to poll an available network packet form processing from the HFI 126 (e.g., via an HFI/host interface (not shown)) and perform some level of processing operation on at least a portion of the data of the network packet. As also described previously, upon completion of the processing operation, the processor core 110 is further configured to provide some indication that one or more cache lines are to be demoted from the core-local cache 114 to the shared cache 116.

Referring back to FIG. 4, as illustratively shown, the indication provided by the processor core 110 is in the form of one or more cache line demote instructions. It should be appreciated that each cache line demote instruction is usable to identify a cache line from the core-local cache 114 and demote the data to the shared cache 116. As such, it should be appreciated that such instructions may not be as efficient for larger packets. Accordingly, the processor 110 may be configured to, for larger blocks of data, utilize the cache line demote device to offload the demote operation. To do so, referring again to FIG. 5, the processor 110 may be configured to transmit a cache line demotion command 502 to the cache line demote device 130 to trigger a cache line demotion operation to be performed by the cache line demote device 130, such as may be performed via a data read request, a DMA request, etc., or any other type of request that will result in the data being demoted to shared cache 116 as a side effect without wasting processor core cycles.

As illustratively shown in both FIGS. 4 and 5, the data in core-local cache line (1) 404*a*, core-local cache line (2) 404*b*, and core-local cache line (3) 404*c* is associated with the processed network packet, as indicated by the highlighted outline surrounding each of those core-local cache lines 404. As also illustratively shown, the cache line demotion operation results in that data being demoted such that the data in core-local cache line (1) 404*a* is demoted to shared cache line (1) 406*a*, the data in core-local cache line (2) 404*b* is demoted to shared cache line (2) 406*b*, and the data in core-local cache line (3) 404*c* is demoted to shared cache line (3) 406*c*; however, it should be appreciated that, as a result of the cache line demotion operation, the demoted cache lines may be moved to any available shared cache lines 406.

Examples

Illustrative examples of the technologies disclosed herein are provided below. An embodiment of the technologies may include any one or more, and any combination of, the examples described below.

Example 1 includes a compute device for demoting cache lines to a shared cache, the compute device comprising one or more processors, wherein each of the one or more processors includes a plurality of processor cores; a cache memory, wherein the cache memory includes a core-local cache and a shared cache, wherein the core-local cache includes a plurality of core-local cache lines, and wherein the shared cache includes a plurality of shared cache lines; a cache line demote device; and a host fabric interface (HFI) to receive a network packet, wherein a processor core of a processor of the one or more processors is to retrieve at least a portion of data of the received network packet, wherein to retrieve the data comprises to move the data into one or more core-local cache lines of the plurality of core-local cache lines; perform one or more processing operations on the data; and transmit, subsequent to having completed the one or more processing operations on the data, a cache line demotion command to the cache line demote device, and wherein the cache line demote device is to perform, in response to having received the cache line demotion command, a cache line demotion operation to demote the data from the one or more core-local cache lines to one or more shared cache lines of the shared cache.

Example 2 includes the subject matter of Example 1, and wherein the processor core is further to determine, subsequent to having completed the one or more processing operations on the data, whether a size of the received network packet is greater than a packet size threshold, wherein to transmit the cache line demotion command to the cache line demote device comprises to transmit the cache line demotion command subsequent to a determination that the size of the received network packet is greater than the packet size threshold.

Example 3 includes the subject matter of any of Examples 1 and 2, and wherein the processor core is further to transmit, subsequent to having determined that the size of the received network packet is less than or equal to the packet size threshold, a cache line demote instruction to a cache manager of the cache memory, and wherein the cache manager is to demote the data from the one or more core-local cache lines to the one or more shared cache lines of the shared cache based on the cache line demote instruction, wherein the cache line demote instruction bypasses the cache line demote device.

Example 4 includes the subject matter of any of Examples 1-3, and wherein to transmit the cache line demotion instruction includes to transmit one or more cache line identifiers corresponding to the one or more shared cache lines.

Example 5 includes the subject matter of any of Examples 1-4, and wherein to perform the cache line demotion operation comprises to perform a read request or a direct memory access.

Example 6 includes the subject matter of any of Examples 1-5, and wherein the cache line demotion command includes an indication of the core-local cache lines associated with the received network packet that are to be demoted to the shared cache.

Example 7 includes the subject matter of any of Examples 1-6, and wherein the cache line demote device comprises one of a copy engine, a direct memory access (DMA) device usable to copy data, or an offload device usable to perform a read operation.

Example 8 includes the subject matter of any of Examples 1-7, and wherein to transmit the cache line demotion command includes to transmit one or more cache line identifiers corresponding to the one or more shared cache lines.

Example 9 includes one or more machine-readable storage media comprising a plurality of instructions stored thereon that, in response to being executed, cause a compute device to retrieve, by a processor of the compute device, at least a portion of data of a network packet received by a host fabric interface (HFI) of the compute device, wherein to retrieve the data comprises to move the data into one or more core-local cache lines of a plurality of core-local cache lines of a core-local cache of the compute device, and wherein the processor includes a plurality of processor cores; perform, by a processor core of the plurality of processor cores, one or more processing operations on the data; transmit, by the processor and subsequent to having completed the one or more processing operations on the data, a cache line demotion command to a cache line demote device of the compute device; and perform, by the cache line demote device and in response to having received the cache line demotion command, a cache line demotion operation to demote the data from the one or more core-local cache lines to one or more shared cache lines of a shared cache of the compute device.

Example 10 includes the subject matter of Example 9, and wherein the processor core is further to determine, subsequent to having completed the one or more processing operations on the data, whether a size of the received network packet is greater than a packet size threshold, wherein to transmit the cache line demotion command to the cache line demote device comprises to transmit the cache line demotion command subsequent to a determination that the size of the received network packet is greater than the packet size threshold.

Example 11 includes the subject matter of any of Examples 9 and 10, and wherein the processor core is further to transmit, subsequent to having determined that the size of the received network packet is less than or equal to the packet size threshold, a cache line demote instruction to a cache manager of a cache memory that includes the core-local cache and the shared cache, and wherein the cache manager is to demote the data from the one or more core-local cache lines to the one or more shared cache lines of the shared cache based on the cache line demote instruction.

Example 12 includes the subject matter of any of Examples 9-11, and wherein to transmit the cache line demotion instruction includes to transmit one or more cache line identifiers corresponding to the one or more shared cache lines.

Example 13 includes the subject matter of any of Examples 9-12, and wherein to perform the cache line demotion operation comprises to perform a read request or a direct memory access.

Example 14 includes the subject matter of any of Examples 9-13, and wherein to transmit the cache line demotion command includes to transmit one or more cache line identifiers corresponding to the one or more shared cache lines.

Example 15 includes a method for demoting cache lines to a shared cache, the method comprising retrieving, by a processor of the compute device, at least a portion of data of a network packet received by a host fabric interface (HFI) of the compute device, wherein to retrieve the data comprises to move the data into one or more core-local cache lines of a plurality of core-local cache lines of a core-local cache of the compute device, and wherein the processor includes a plurality of processor cores; performing, by a processor core of the plurality of processor cores, one or more processing operations on the data; transmitting, by the processor core and subsequent to having completed the one or more processing operations on the data, a cache line demotion command to a cache line demote device of the compute device; and performing, by the cache line demote device and in response to having received the cache line demotion command, a cache line demotion operation to demote the data from the one or more core-local cache lines to one or more shared cache lines of a shared cache of the compute device.

Example 16 includes the subject matter of Example 15, and further including determining, subsequent to having completed the one or more processing operations on the data, whether a size of the received network packet is greater than a packet size threshold, wherein transmitting the cache line demotion command to the cache line demote device comprises to transmitting the cache line demotion command subsequent to a determination that the size of the received network packet is greater than the packet size threshold.

Example 17 includes the subject matter of any of Examples 15 and 16, and further including transmitting, by the processor core and subsequent to having determined that the size of the received network packet is less than or equal to the packet size threshold, a cache line demote instruction to a cache manager of a cache memory that includes the core-local cache and the shared cache; and demoting, by the cache manager, the data from the one or more core-local cache lines to the one or more shared cache lines of the shared cache based on the cache line demote instruction.

Example 18 includes the subject matter of any of Examples 15-17, and wherein transmitting the cache line demotion instruction includes transmitting one or more cache line identifiers corresponding to the one or more shared cache lines.

Example 19 includes the subject matter of any of Examples 15-18, and wherein performing the cache line demotion operation comprises performing one of a read request or a direct memory access.

Example 20 includes the subject matter of any of Examples 15-19, and wherein transmitting the cache line demotion command includes transmitting one or more cache line identifiers corresponding to the one or more shared cache lines.

Example 21 includes a compute device for demoting cache lines to a shared cache, the compute device comprising circuitry for retrieving, by a processor of the compute device, at least a portion of data of a network packet received by a host fabric interface (HFI) of the compute device, wherein to retrieve the data comprises to move the data into one or more core-local cache lines of a plurality of core-local cache lines of a core-local cache of the compute device, and wherein the processor includes a plurality of processor cores; circuitry for performing, by a processor core of the plurality of processor cores, one or more processing operations on the data; circuitry for transmitting, by the processor core and subsequent to having completed the one or more processing operations on the data, a cache line demotion command to a cache line demote device of the compute device; and means for performing, by the cache line demote device and in response to having received the cache line demotion command, a cache line demotion operation to demote the data from the one or more core-local cache lines to one or more shared cache lines of a shared cache of the compute device.

Example 22 includes the subject matter of Example 21, and further including circuitry for determining, subsequent to having completed the one or more processing operations on the data, whether a size of the received network packet is greater than a packet size threshold, wherein transmitting the cache line demotion command to the cache line demote device comprises to transmitting the cache line demotion command subsequent to a determination that the size of the received network packet is greater than the packet size threshold.

Example 23 includes the subject matter of any of Examples 21 and 22, and further including circuitry for transmitting, by the processor core and subsequent to having determined that the size of the received network packet is less than or equal to the packet size threshold, a cache line demote instruction to a cache manager of a cache memory that includes the core-local cache and the shared cache; and circuitry for demoting, by the cache manager, the data from the one or more core-local cache lines to the one or more shared cache lines of the shared cache based on the cache line demote instruction.

Example 24 includes the subject matter of any of Examples 21-23, and wherein transmitting the cache line demotion instruction includes transmitting one or more cache line identifiers corresponding to the one or more shared cache lines.

Example 25 includes the subject matter of any of Examples 21-24, and wherein the means for performing the cache line demotion operation comprises means for performing one of a read request or a direct memory access.

The invention claimed is:

1. A compute device for demoting cache lines to a shared cache, the compute device comprising:

one or more processors, wherein each of the one or more processors includes a plurality of processor cores;

a cache memory, wherein the cache memory includes a core-local cache and a shared cache, wherein the core-local cache includes a plurality of core-local cache lines, and wherein the shared cache includes a plurality of shared cache lines;

a cache line demote device; and a host fabric interface (HFI) to receive a network packet, wherein a processor core of a processor of the one or more processors is to:

retrieve at least a portion of data of the received network packet, wherein to retrieve the data comprises to move the data into one or more core-local cache lines of the plurality of core-local cache lines;

perform one or more processing operations on the data; and transmit, subsequent to having completed the one or more processing operations on the data and in response to a determination by the processor core that a size of the received network packet is greater than a packet size threshold, a cache line demotion command to the cache line demote device, and wherein the cache line demote device is to perform, in response to having received the cache line demotion command, a cache line demotion operation to demote the data from the one or more core-local cache lines to one or more shared cache lines of the shared cache.

2. The compute device of claim 1, wherein the processor core is further to transmit, subsequent to having determined that the size of the received network packet is less than or equal to the packet size threshold, a cache line demote instruction to a cache manager of the cache memory, and wherein the cache manager is to demote the data from the one or more core-local cache lines to the one or more shared cache lines of the shared cache based on the cache line demote instruction, wherein the cache line demote instruction bypasses the cache line demote device.

3. The compute device of claim 2, wherein to transmit the cache line demotion instruction includes to transmit one or more cache line identifiers corresponding to the one or more shared cache lines.

4. The compute device of claim 1, wherein to perform the cache line demotion operation comprises to perform a read request or a direct memory access.

5. The compute device of claim 1, wherein the cache line demotion command includes an indication of the core-local cache lines associated with the received network packet that are to be demoted to the shared cache.

6. The compute device of claim 1, wherein the cache line demote device comprises one of a copy engine, a direct memory access (DMA) device usable to copy data, or an offload device usable to perform a read operation.

7. The compute device of claim 1, wherein to transmit the cache line demotion command includes to transmit one or more cache line identifiers corresponding to the one or more shared cache lines.

8. One or more machine-readable storage media comprising a plurality of instructions stored thereon that, in response to being executed, cause a compute device to:

retrieve, by a processor of the compute device, at least a portion of data of a network packet received by a host fabric interface (HFI) of the compute device, wherein to retrieve the data comprises to move the data into one or more core-local cache lines of a plurality of core-local cache lines of a core-local cache of the compute device, and wherein the processor includes a plurality of processor cores;

perform, by a processor core of the plurality of processor cores, one or more processing operations on the data;

transmit, by the processor subsequent to having completed the one or more processing operations on the data and in response to a determination by the processor core that a size of the received network packet is greater than a packet size threshold, a cache line demotion command to a cache line demote device of the compute device; and perform, by the cache line demote device and in response to having received the cache line demotion command, a cache line demotion operation to demote the data from the one or more core-local cache lines to one or more shared cache lines of a shared cache of the compute device.

9. The one or more machine-readable storage media of claim 8, wherein the processor core is further to transmit, subsequent to having determined that the size of the received network packet is less than or equal to the packet size threshold, a cache line demote instruction to a cache manager of a cache memory that includes the core-local cache and the shared cache, and wherein the cache manager is to demote the data from the one or more core-local cache lines to the one or more shared cache lines of the shared cache based on the cache line demote instruction.

10. The one or more machine-readable storage media of claim 9, wherein to transmit the cache line demotion instruction includes to transmit one or more cache line identifiers corresponding to the one or more shared cache lines.

11. The one or more machine-readable storage media of claim 8, wherein to perform the cache line demotion operation comprises to perform a read request or a direct memory access.

12. The one or more machine-readable storage media of claim 8, wherein to transmit the cache line demotion command includes to transmit one or more cache line identifiers corresponding to the one or more shared cache lines.

13. A method for demoting cache lines to a shared cache, the method comprising:

retrieving, by a processor of the compute device, at least a portion of data of a network packet received by a host fabric interface (HFI) of the compute device, wherein to retrieve the data comprises to move the data into one or more core-local cache lines of a plurality of core-local cache lines of a core-local cache of the compute device, and wherein the processor includes a plurality of processor cores;

performing, by a processor core of the plurality of processor cores, one or more processing operations on the data;

transmitting, by the processor core and subsequent to having completed the one or more processing operations on the data and in response to a determination by the processor core that a size of the received network packet is greater than a packet size threshold, a cache line demotion command to a cache line demote device of the compute device; and performing, by the cache line demote device and in response to having received the cache line demotion command, a cache line demotion operation to demote the data from the one or more core-local cache lines to one or more shared cache lines of a shared cache of the compute device.

14. The method of claim 13, further comprising:

transmitting, by the processor core and subsequent to having determined that the size of the received network packet is less than or equal to the packet size threshold, a cache line demote instruction to a cache manager of a cache memory that includes the core-local cache and the shared cache; and demoting, by the cache manager, the data from the one or more core-local cache lines to the one or more shared cache lines of the shared cache based on the cache line demote instruction.

15. The method of claim 14, wherein transmitting the cache line demotion instruction includes transmitting one or more cache line identifiers corresponding to the one or more shared cache lines.

16. The method of claim 13, wherein performing the cache line demotion operation comprises performing one of a read request or a direct memory access.

17. The method of claim 13, wherein transmitting the cache line demotion command includes transmitting one or more cache line identifiers corresponding to the one or more shared cache lines.

18. A compute device for demoting cache lines to a shared cache, the compute device comprising:

circuitry for retrieving, by a processor of the compute device, at least a portion of data of a network packet received by a host fabric interface (HFI) of the compute device, wherein to retrieve the data comprises to move the data into one or more core-local cache lines of a plurality of core-local cache lines of a core-local cache of the compute device, and wherein the processor includes a plurality of processor cores;

circuitry for performing, by a processor core of the plurality of processor cores, one or more processing operations on the data;

circuitry for transmitting, by the processor core subsequent to having completed the one or more processing operations on the data and in response to a determination by the processor core that a size of the received network packet is greater than a packet size threshold, a cache line demotion command to a cache line demote device of the compute device; and means for performing, by the cache line demote device and in response to having received the cache line demotion command, a cache line demotion operation to demote the data from the one or more core-local cache lines to one or more shared cache lines of a shared cache of the compute device.

19. The compute device of claim 18, further comprising:

circuitry for transmitting, by the processor core and subsequent to having determined that the size of the received network packet is less than or equal to the packet size threshold, a cache line demote instruction to a cache manager of a cache memory that includes the core-local cache and the shared cache; and circuitry for demoting, by the cache manager, the data from the one or more core-local cache lines to the one or more shared cache lines of the shared cache based on the cache line demote instruction.

20. The compute device of claim 19, wherein transmitting the cache line demotion instruction includes transmitting one or more cache line identifiers corresponding to the one or more shared cache lines.

21. The compute device of claim 18, wherein the means for performing the cache line demotion operation comprises means for performing one of a read request or a direct memory access.

* * * * *